(12) United States Patent
Yamakawa et al.

(10) Patent No.: US 7,369,923 B2
(45) Date of Patent: May 6, 2008

(54) CONTROL SYSTEM AND METHOD

(75) Inventors: Takesi Yamakawa, Iizuka (JP); Hitoshi Maeno, Nishinomiya (JP); Eiji Uchino, Iizuka (JP); Hirohiko Morita, Iizuka (JP)

(73) Assignee: Furuno Electric Company, Limted., Hyogo-Ken (JP)

( * ) Notice: Subject to any disclaimer, the term of this patent is extended or adjusted under 35 U.S.C. 154(b) by 429 days.

(21) Appl. No.: 10/809,340

(22) Filed: Mar. 26, 2004

(65) Prior Publication Data

US 2004/0193337 A1 Sep. 30, 2004

(51) Int. Cl.
*B60L 3/00* (2006.01)
*B60L 15/00* (2006.01)
*G05D 1/00* (2006.01)
*G05D 3/00* (2006.01)

(52) U.S. Cl. .......................... 701/21; 701/41; 318/580; 318/588; 114/144 R

(58) Field of Classification Search ................. 701/21, 701/41; 318/580, 588; 114/144 R
See application file for complete search history.

(56) References Cited

U.S. PATENT DOCUMENTS

| | | | | |
|---|---|---|---|---|
| 3,083,473 | A * | 4/1963 | Luton | 434/34 |
| 3,290,677 | A * | 12/1966 | Jacob | 342/23 |
| 3,517,285 | A * | 6/1970 | Kundler | 318/588 |
| 3,604,907 | A * | 9/1971 | Wesner | 701/116 |
| 3,656,043 | A * | 4/1972 | Kawada et al. | 318/588 |
| 3,696,282 | A * | 10/1972 | Hirokawa et al. | 318/588 |
| 5,014,216 | A * | 5/1991 | Stafford et al. | 702/25 |
| 5,524,079 | A * | 6/1996 | Ishida et al. | 701/42 |
| 6,122,584 | A * | 9/2000 | Lin et al. | 701/70 |
| 6,324,445 | B2 * | 11/2001 | Tozu et al. | 701/1 |
| 7,039,507 | B2 * | 5/2006 | Hagenbuch | 701/29 |
| 2004/0193332 | A1 * | 9/2004 | Yamakawa et al. | 701/1 |
| 2004/0193337 | A1 * | 9/2004 | Yamakawa et al. | 701/21 |

FOREIGN PATENT DOCUMENTS

| | | |
|---|---|---|
| GB | 2 289 960 A | 12/1995 |
| GB | 2 299 415 A | 10/1996 |
| JP | 2001-312302 A | 11/2001 |
| JP | 2004-303086 A | 10/2004 |

OTHER PUBLICATIONS

Nicholas Minorsky and the automatic steering of ships, Bennett, S.; Control Systems Magazine, IEEE vol. 4, Issue 4, Nov. 1984 pp. 10-15.*

(Continued)

*Primary Examiner*—Cuong Nguyen
(74) *Attorney, Agent, or Firm*—Birch, Stewart, Kolasch & Birch, LLP

(57) ABSTRACT

A control system of the invention for regulating a quantity to be controlled based on a deviation of the controlled quantity from a target value thereof and control parameters includes a behavior feature value calculator, a basic state judgment data calculator and a control parameter setter. The behavior feature value calculator detects the period or frequency of behaviors of a specific kind performed by a subject to be controlled. The basic state judgment data calculator calculates the amount of variations in the aforementioned period or frequency. The control parameter setter updates the value of at least one of the control parameters based on the amount of the aforementioned variations.

14 Claims, 10 Drawing Sheets

OTHER PUBLICATIONS

Swath bathymetry with GLORIA, Le Bas, T.P.; Somers, M.L.; Campbell, J.M.; Beale, R.; Oceanic Engineering, IEEE Journal of vol. 21, Issue 4, Oct. 1996, pp. 545-553, Digital Object Identifier 10.1109/48.544064.*

Shipborne GPS attitude determination during MMST-93, Lachapelle, G.; Cannon, M.E.; Lu, G.; Loncarevic, B.; Oceanic Engineering, IEEE Journal of vol. 21, Issue 1, Jan. 1996 pp. 100-104, Digital Object Identifier 10.1109/48.485206.*

Coriolis Program: A Review of the Status of the Ocean Turbine Energy System, Lissamen, P.; Radkey, R.; OCEANS vol. 11, Sep. 1979 pp. 559-565.*

Ship 3D model estimation from an ISAR image sequence, Cooke, T.; Radar Conference, 2003. Proceedings of the International Sep. 3-5, 2003 pp. 36-41, Digital Object Identifier 10.1109/RADAR.2003.1278706.*

Guidance and control of the SIRENE underwater vehicle: from system design to tests at sea, Oliverira, P.; Silvestre, C.; Aguiar, P.; Pascoal, A.; OCEANS '98 Conference Proceedings, vol. 2, Sep. 28-Oct. 1, 1998 pp. 1043-1048 vol. 2 Digital Object Identifier 10.1109/OCEANS.1998.724395.*

INS-based identification of quay-crane spreader yaw, Louda, M.A.; Rye, D.C.; Dissanayke, M.W.M.G.; Durrant-Whyte, H.F.; Robotics and Automation, 1998. Proceedings. 1998 IEEE International Conference on, vol. 4, May 16-20, 1998 pp. 3310-3315 vol. 4, Digital Object Identifier 10.1109/ROBOT.1998.680949.*

Simulation on the motion characteristics of an unmanned untethered submersible, Tanaka, N.; Mochizuki, M.; Oda, T.; Unmanned Untethered Submersible Technology, Proceedings of the 1985 4th International Symposium on, vol. 4, Jun. 1985 pp. 198-222.*

* cited by examiner

22: Steeringt Amount Calculator

Fig. 7

| T1 | T2 | T3 | T4 | T5 |
|----|----|----|----|----|

| S1 | S2 | S3 | S4 | S5 |
|----|----|----|----|----|

| $\theta c1^2$ | $\theta c2^2$ | $\theta c3^2$ | $\theta c4^2$ | $\theta c5^2$ |
|---------------|---------------|---------------|---------------|---------------|

Fig. 8a
| Oscillation index | | S_AVE | | |
|---|---|---|---|---|
| | | small | medium | large |
| T_SD | small | zero | small | large |
| | medium | zero | zero | zero |
| | large | zero | zero | zero |
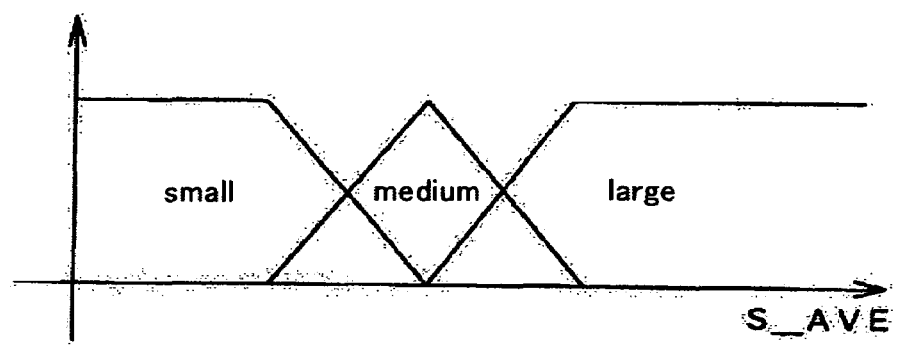
Fig. 8b
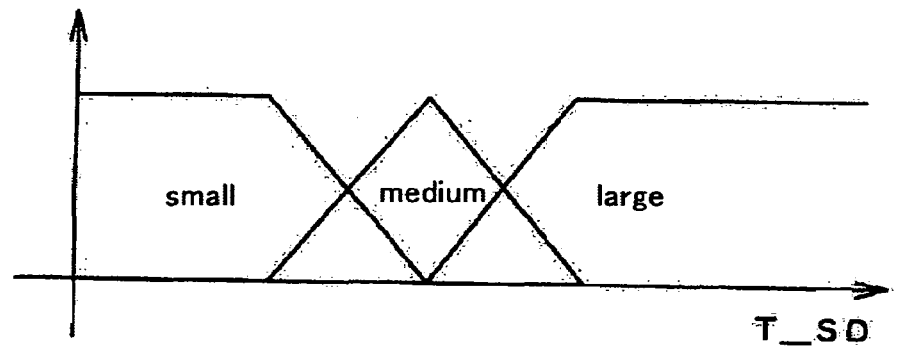
Fig. 8c Fig. 9a
| Disturbance Index | | S_MAX | | |
|---|---|---|---|---|
| | | small | medium | large |
| T_SD | small | zero | zero | zero |
| | medium | zero | zero | zero |
| | large | zero | small | large |
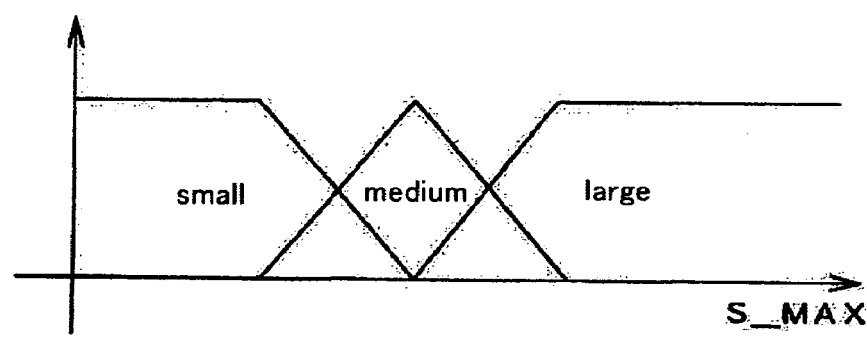
Fig. 9b
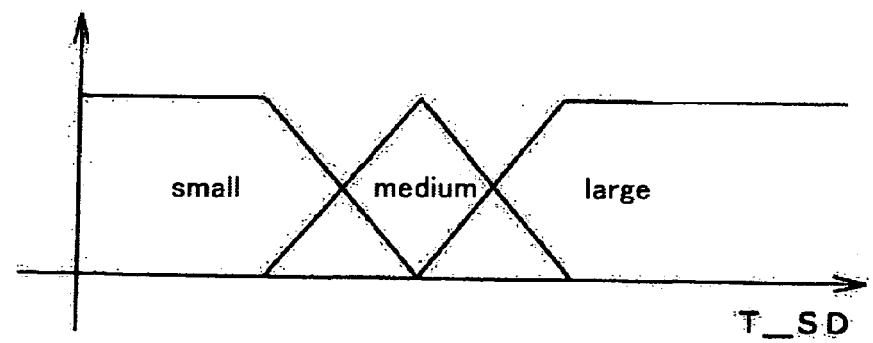
Fig. 9c

CONTROL SYSTEM AND METHOD

This Nonprovisional application claims priority under 35 U.S.C. § 119(a) on Patent Application No(s). 2003-097320 filed in Japan on Mar. 31, 2003, the entire contents of which are hereby incorporated by reference.

BACKGROUND OF THE INVENTION

The present invention relates generally to a control system and a control method as well as to a control state judgment device and a control state judgment method. More particularly, the invention pertains to a system and a method which can offer an increased accuracy in detecting an oscillating state in feedback control operation.

A situation occasionally experienced in feedback control operation is oscillation of a controlled system, or subject, in which a deviation of a quantity to be controlled from a target value thereof cyclically increases and decreases in a regular pattern. It is desirable to instantly detect such an oscillating state and vary appropriate control parameters in a manner suitable for the situation.

When the controlled subject is subjected to cyclically occurring external disturbances, the deviation of the controlled quantity from the target value oscillates (repetitively increases and decreases) in a regular pattern. In the presence of such oscillation, it is difficult to distinguish between the oscillation caused by the disturbances and ordinary oscillation caused by the feedback control operation. In a process of controlling the heading of a ship, for example, it is difficult to distinguish between an oscillating state caused by feedback control operation and an oscillating state caused by the influence of such external disturbances as cyclical rises and falls of ocean waves. Although it might be possible to distinguish between two kinds of oscillation based on whether the amplitude of periodic changes in the controlled quantity exceeds a preset threshold or not, the value of the threshold to be preset greatly varies with the type and nature of the controlled subject and seriousness of disturbances, so that this threshold approach imposes a great deal of difficulty in designing a control system.

SUMMARY OF THE INVENTION

The present invention is intended to overcome the aforementioned problem of the prior art. Accordingly, it is an object of the present invention to provide a control system and a control method which make it possible to properly control a subject to be controlled according to a current situation thereof whether the controlled subject is in an oscillating state caused by cyclically occurring external disturbances or in an oscillating state caused by ordinary control operation regardless of the type of the controlled subject and the nature of the disturbances.

It is another object of the present invention to provide a control state judgment device and a control state judgment method which make it possible to properly distinguish between an oscillating state caused by cyclically occurring external disturbances and an oscillating state caused by ordinary control operation regardless of the type of a subject to be controlled and the nature of the disturbances.

A control system of the invention for regulating a quantity to be controlled based on a deviation of the controlled quantity from a target value thereof and control parameters includes a behavior feature value detector, a variation calculator and a control parameter updator. The behavior feature value detector detects the period or frequency of behaviors of a specific kind performed by a subject to be controlled. The variation calculator calculates the amount of variations in the aforementioned period or frequency. The control parameter updator updates the value of at least one of the control parameters based on the amount of the aforementioned variations.

A control method of the invention for regulating a quantity to be controlled based on a deviation of the controlled quantity from a target value thereof and control parameters includes a behavior feature value detecting step, a variation calculating step and a control parameter updating step. The behavior feature value detecting step detects the period or frequency of behaviors of a specific kind performed by a subject to be controlled. The variation calculating step calculates the amount of variations in the aforementioned period or frequency. The control parameter updating step updates the value of at least one of the control parameters based on the amount of the aforementioned variations.

Generally, variations in a controlled quantity caused by cyclically occurring external disturbances are less "periodic" as compared to variations in the controlled quantity caused by oscillation thereof. According to the invention, the control system and the method used therein detect the period or frequency of behaviors of the controlled subject and vary the control parameters based on the amount of variations in the period or frequency of the behaviors, so that it is possible to properly control the subject even when the same is subjected to the influence of cyclically occurring external disturbances or oscillation of the controlled quantity.

In one feature of the invention, the control parameter updator decreases the value of a proportional control coefficient which constitutes one of the control parameters according to the amplitude of the controlled quantity when the amount of the aforementioned variations is smaller than a specific threshold value. This makes it possible to improve oscillating conditions caused by oscillation of the controlled quantity.

In another feature of the invention, the control parameter updator increases the value of a proportional control coefficient which constitutes one of the control parameters according to the magnitude of the deviation when the amount of the aforementioned variations is equal to or larger than a specific threshold value. In this form of the control system and method, the value of the proportional control coefficient may be increased only when the amount of the aforementioned variations is equal to or larger than the specific threshold value and the aforementioned deviation is equal to or larger than a specific value. Alternatively, the value of the proportional control coefficient may be increased by an amount corresponding to the magnitude of the aforementioned deviation. These alternative approaches make it possible to reduce the influence of external disturbances.

In another feature of the invention, the control parameter updator decreases the value of a differential control coefficient which constitutes one of the control parameters when the amount of the aforementioned variations is equal to or larger than the specific threshold value. This makes it possible to swiftly reduce the influence of external disturbances.

In another feature of the invention, the variation calculator calculates the amount of the aforementioned variations based on a standard deviation of the periods or frequencies of a specific number of the latest behaviors. This makes it possible to properly reflect a current control state in controlling the subject.

In still another feature of the invention, the control system further includes a behavior detector for successively determining a time range of each behavior of the specific kind performed by the controlled subject based on the control parameters. The behavior feature value detector detects the aforementioned period or frequency of the behaviors of the specific kind based on the time range. In the control system thus constructed, the behavior detector may determine timings at which the controlled quantity takes extrema as being a start timing and an end timing of the time range of each behavior. This arrangement makes it possible to easily detect cyclical behaviors of the controlled subject.

In a further feature of the invention, the controlled subject is a ship, the controlled quantity is the ship's heading, and the control system controls a steering device onboard the ship. The control system, if applied to a ship, can properly control the steering device of the ship.

A control state judgment device used in a control system of the invention for regulating a quantity to be controlled based on a deviation of the controlled quantity from a target value thereof and control parameters includes a behavior feature value detector, a variation calculator and a control state judgment section. The behavior feature value detector detects the period or frequency of behaviors of a specific kind performed by a subject to be controlled. The variation calculator calculates the amount of variations in the aforementioned period or frequency. The control state judgment section updates a control state of the controlled subject based on the amount of the aforementioned variations.

A control state judgment method used in a control system of the invention for regulating a quantity to be controlled based on a deviation of the controlled quantity from a target value thereof and control parameters includes a behavior feature value detecting step, a behavior feature value detecting step and a control state judgment step. The behavior feature value detecting step of detecting the period or frequency of behaviors of a specific kind performed by a subject to be controlled. The variation calculating step of calculating the amount of variations in the aforementioned period or frequency. The control state judgment step of determining a control state of the controlled subject based on the amount of the aforementioned variations.

As already mentioned, variations in a controlled quantity caused by cyclically occurring external disturbances are less "periodic" as compared to variations in the controlled quantity caused by oscillation thereof. According to the invention, the control state judgment device and the method used therein detect the period or frequency of behaviors of the controlled subject and judges the control state of the controlled subject based on the amount of variations in the aforementioned period or frequency, so that it is possible to properly judge the control state by distinguishing between the variations in the controlled quantity caused by cyclically occurring external disturbances and the variations in the controlled quantity caused by oscillation thereof.

Other features and advantages of the invention will be more readily understood from the following detailed description of a specific embodiment thereof when read in conjunction with accompanying drawings.

BRIEF DESCRIPTION OF THE DRAWINGS

FIG. 7 is a diagram showing a content of data stored in a behavior feature value memory;

FIGS. 8A, 8B, 8C are diagrams showing fuzzy inference data used for evaluating the value of an oscillation index by fuzzy inference;

FIGS. 9A, 9B, 9C are diagrams showing fuzzy inference data used for evaluating the value of a disturbance index by fuzzy inference;

DETAILED DESCRIPTION OF THE PREFERRED EMBODIMENT OF THE INVENTION

The invention is now described in detail, by way of example, with reference to a preferred embodiment thereof illustrated in the accompanying drawings.

Figure 1:
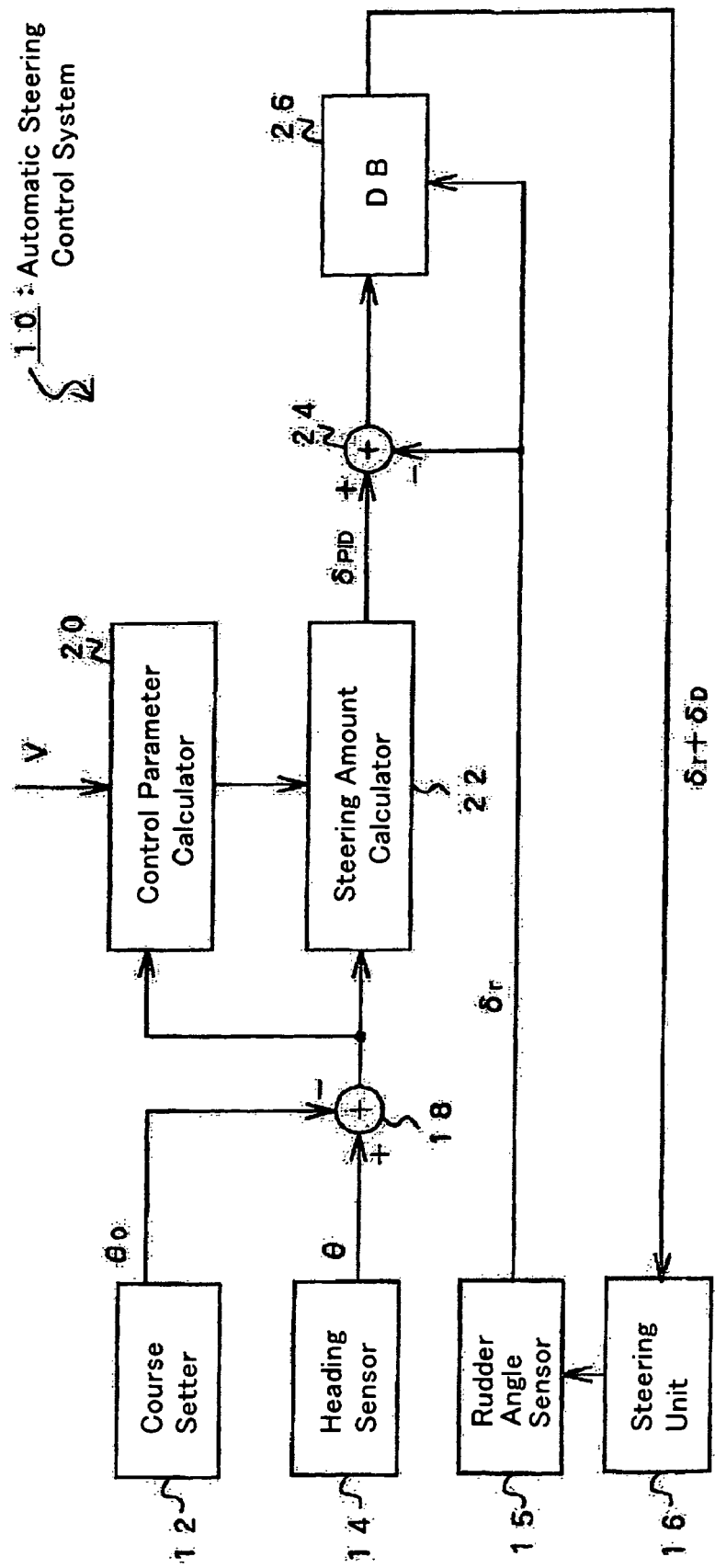
FIG. 1 is a block diagram showing the configuration of an automatic steering control system according to a preferred embodiment of the invention.

FIG. 1 is a block diagram showing the configuration of an automatic steering control system 10 according to the preferred embodiment of the invention. Installed on a ship (subject to be controlled), the automatic steering control system 10 includes a course setter 12, a heading sensor 14, a rudder angle sensor 15, a steering unit 16, adders 18, 24, a control parameter calculator 20, a steering amount calculator 22 and a deadband processor 26 as shown in FIG. 1. The automatic steering control system 10 controls the heading of the ship by automatically operating the steering unit 16.

The course setter 12 outputs information on an intended course θ0 (target value) of the ship. The intended course θ0 may be manually set by a course setting knob or given through mathematical operation by conventional navigation equipment onboard including a satellite positioning system, for example. The intended course θ0 is the intended direction of motion of the ship expressed in degrees (0° to 360°) as measured clockwise from true north. The output of the course setter 12 (θ0) delivered to the adder 18 is assigned a negative sign.

The heading sensor 14 outputs information on a current heading θ (controlled quantity) of the ship. The heading θ of the ship, also expressed in degrees (0° to 360°) as measured clockwise from true north, is delivered to the adder 18 and the control parameter calculator 20. The heading θ may be output through a low-pass filter provided in the heading sensor 14, for example, or an output of the adder 18 may be passed through a low-pass filter.

The steering unit 16 is conventional onboard equipment including a rudder driver for driving a rudder of the ship by means of a hydraulic pump and a cylinder, for example, and a rudder controller for matching a true rudder angle with a demanded rudder angle. The rudder angle sensor 15 connected to the steering unit 16 outputs a current rudder angle, that is, the true rudder angle δr, which is fed into the adder 24 and the deadband processor 26. As the demanded rudder angle (δr+δD) is entered from the deadband processor 26 into the steering unit 16, the steering unit 16 varies the true rudder angle δr so that the true rudder angle δr matches the demanded rudder angle (δr+δD).

The adder 18 calculates a deviation of the current heading θ of the ship output from the heading sensor 14 from the intended course θ0 output from the course setter 12 and supplies this deviation to the steering amount calculator 22. The deviation (θ−θ0) output from the adder 18 is normalized so that the value of the deviation lies within a range of 0°±180°.

Figure 2:
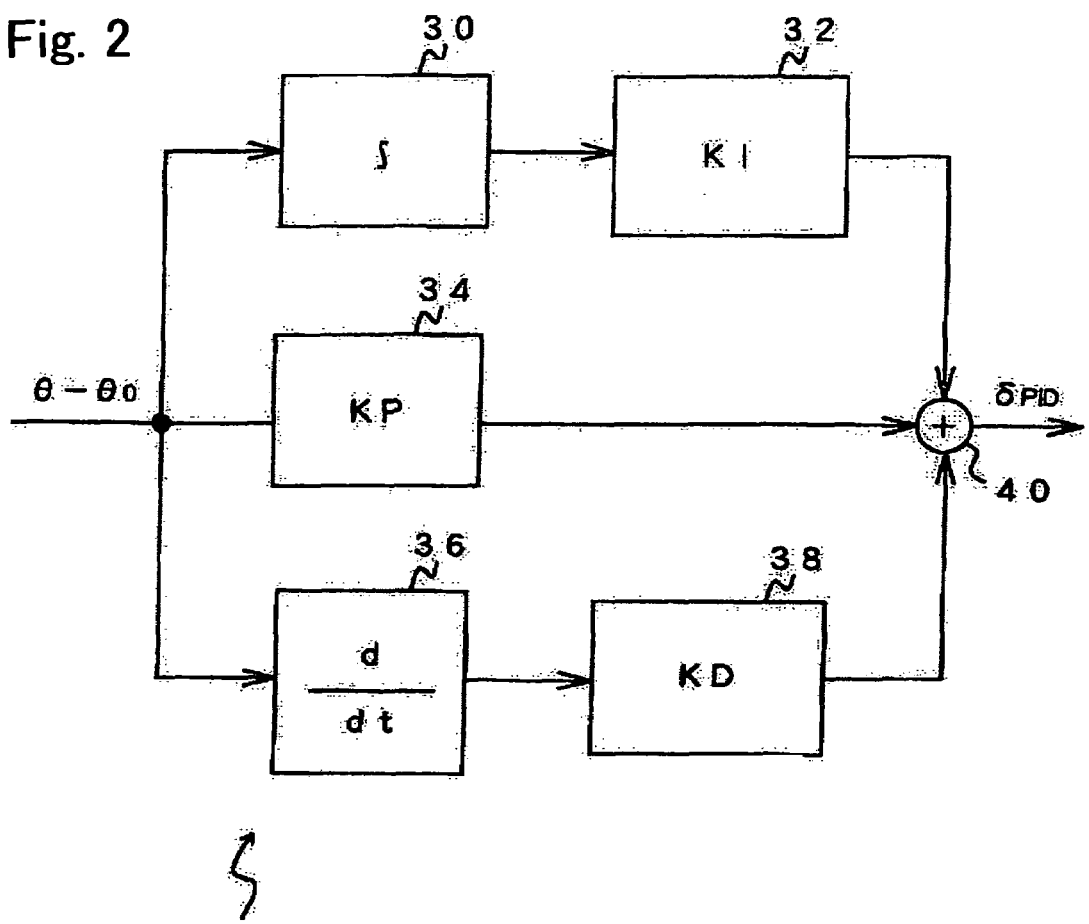
FIG. 2 is a block diagram showing the configuration of a steering amount calculator.

The steering amount calculator 22, to which the output of the adder 18 and an output of the control parameter calculator 20 are supplied, is conventionally known control means which performs proportional-plus-integral-plus-derivative (PID) control action. The steering amount calculator 22 calculates an amount of steering δPID from the deviation (θ−θ0) normalized to the range of 0°±180° based on control parameters including a proportional coefficient (proportional control coefficient) KP, an integral coefficient (integral control coefficient) KI and a differential coefficient (differential control coefficient) KD. The steering amount calculator 22 may be configured by hardware alone or by a computer and a software program executed by the computer. Specifically, the steering amount calculator 22 of this embodiment includes an integrator 30, a differentiator 36, coefficient amplifiers 32, 34, 38 and an adder 40 as shown in FIG. 2. In the steering amount calculator 22 thus configured, the integrator 30 integrates the deviation (θ−θ0) output from the adder 18 and the coefficient amplifier 32 multiplies the result of integration by the integral coefficient KI. At the same time, the coefficient amplifier 34 multiplies the deviation (θ−θ0) by the proportional coefficient KP. Also, the differentiator 36 differentiates the deviation (θ−θ0) and the coefficient amplifier 38 multiplies the result of differentiation by the differential coefficient KD. The results of these calculations are input into the adder 40, which outputs the sum of the input calculation results as the steering amount δPID. The integral coefficient KI, the proportional coefficient KP and the differential coefficient KD are supplied to the coefficient amplifier 32, the coefficient amplifier 34 and the differentiator 36, respectively, and the coefficient amplifier 32, the coefficient amplifier 34 and the differentiator 36 store values of the respective coefficients KI, KP, KD.

The steering amount δPID thus calculated is supplied to the adder 24. As the true rudder angle δr assigned a negative sign output from the rudder angle sensor 15 is also supplied to the adder 24, the adder 24 calculates a difference between the steering amount δPID and the true rudder angle δr. The result of this calculation is supplied to the deadband processor 26.

When the absolute value of the difference between the steering amount δPID and the true rudder angle δr input from the adder 24 is smaller than a specific value DB, the deadband processor 26 sets an internal value δD to zero. When the absolute value of the difference between the steering amount δPID and the true rudder angle δr input from the adder 24 is equal to or larger than the specific value DB, on the other hand, the deadband processor 26 uses the input difference value as the internal value δD for further processing. The true rudder angle δr is also input from the rudder angle sensor 15 into the deadband processor 26. The deadband processor 26 calculates the sum of the true rudder angle δr and the internal value δD and outputs the sum to the steering unit 16. A dead band of the deadband processor 26 in which the demanded rudder angle (δr+δD) is not affected by the output of the steering amount calculator 22 (i.e., the steering amount δPID) is set in the aforementioned manner.

Figure 3:
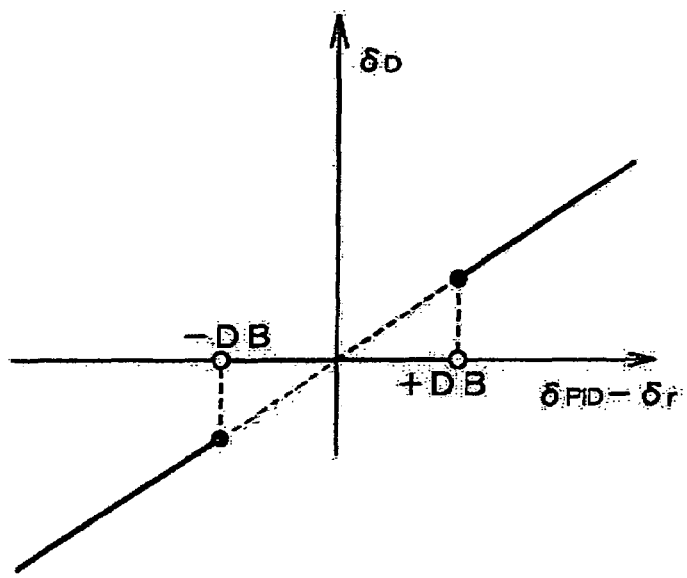
FIG. 3 is a diagram illustrating operation performed by a deadband processor.

The deadband processor 26 may also be configured by hardware alone or by a computer and a software program executed by the computer. There is a relationship shown in FIG. 3 between the input value (δPID−δr) and the internal value δD of the deadband processor 26. The aforementioned specific value DB is supplied from the control parameter calculator 20 to the deadband processor 26.

The control parameter calculator 20 determines the control parameters (proportional coefficient KP, integral coefficient KI and differential coefficient KD) used by the steering amount calculator 22 for calculating the steering amount δPID . The deviation (θ−θ0) of the ship's current heading θ from the intended course θ is fed into the control parameter calculator 20. The control parameter calculator 20 determines the control parameters based on this input data. Again, the steering amount calculator 22 may be configured by hardware alone or by a computer and a software program executed by the computer.

Figure 4:
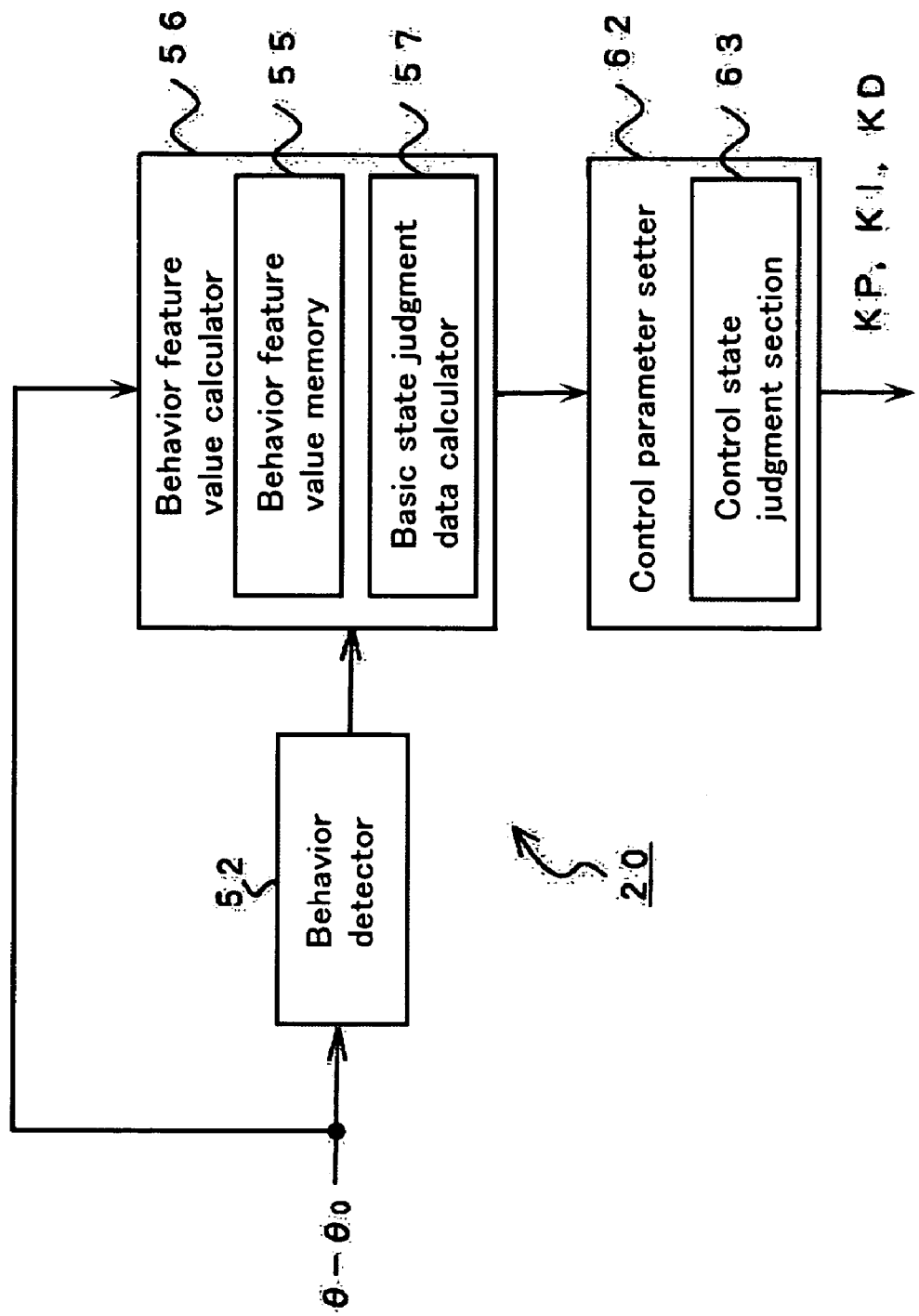
FIG. 4 is a block diagram showing the configuration of a control parameter calculator.

Specifically, the control parameter calculator 20 of this embodiment includes a behavior detector 52, a behavior feature value calculator 56 and a control parameter setter 62 as shown in FIG. 4, in which the behavior feature value calculator 56 includes a behavior feature value memory 55 and a basic state judgment data calculator 57 and the control parameter setter 62 includes a control state judgment section 63. A control state judgment device of the automatic steering control system 10 is formed with this configuration of the control parameter calculator 20.

The deviation (θ−θ0) output from the adder 18 is input into the behavior detector 52 as illustrated. Based on this input, the behavior detector 52 successively determines times at which the ship exhibits a specific behavior pattern, that is, a motion of the ship's head in a horizontal plane (yawing) from a point in time at which the deviation (θ−θ0) of the ship takes a maximal value to a point in time at which the deviation (θ−θ0) takes another maximal value.

Figure 5:
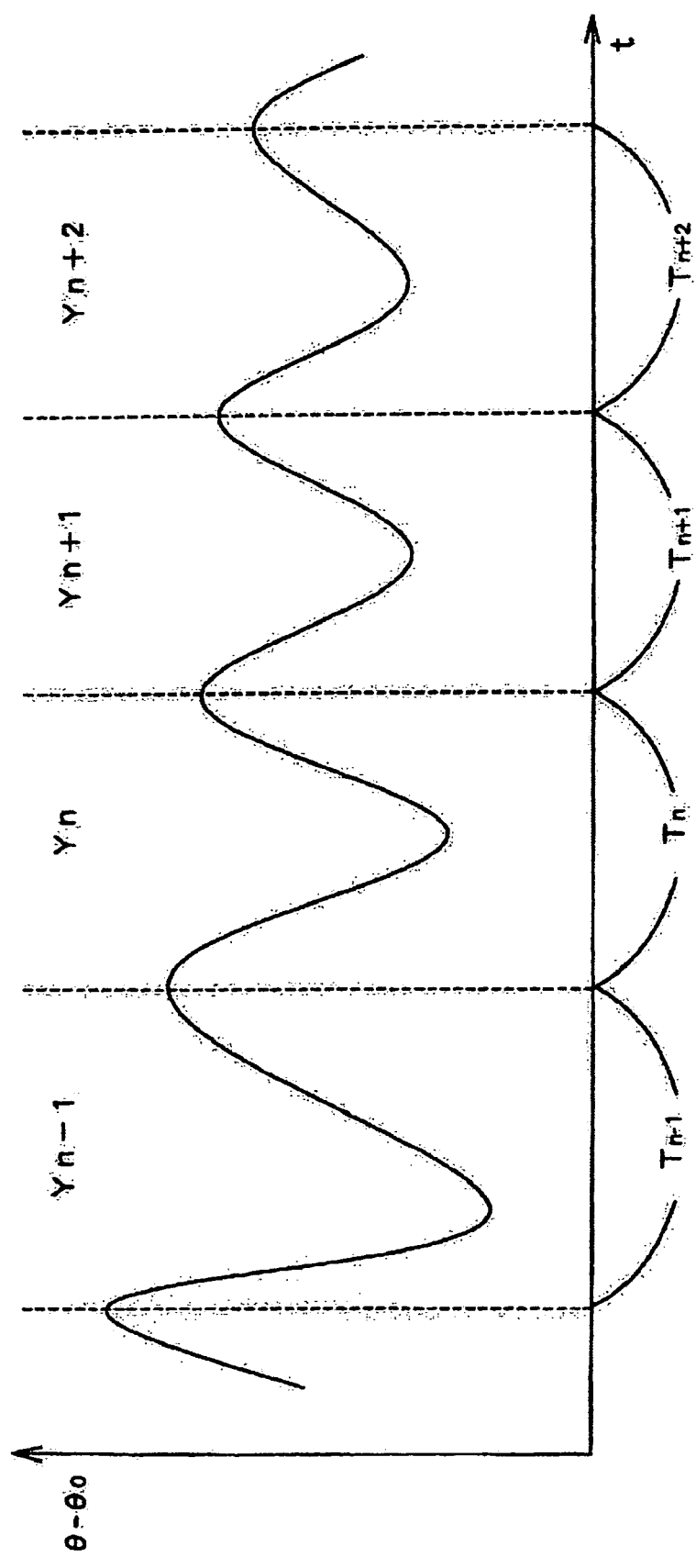
FIG. 5 is a diagram showing how a deviation of a ship's true heading from an intended course varies with time.

As an example, the behavior detector 52 sequentially calculates, based on values of the deviation (θ−θ0) that are sequentially input, a difference between a latest deviation (θ−θ0) and an immediately preceding deviation (θ−θ0), and judges that a point in time at which this difference varies from a positive value to a negative value is a timing at which the ship's heading θ, which is the controlled quantity, takes a maximal value. At the same time, the behavior detector 52 judges that this point in time is an end timing of a preceding behavior of the ship and is also a start timing of a succeeding behavior of the ship. More particularly, the deviation (θ−θ0) output from the adder 18 repetitively increases and decreases under ordinary situations as shown in FIG. 5. The behavior detector 52 detects every point in time at which the deviation (θ−θ0) takes a maximal value, or at which the ship's heading θ takes a maximal value, in a yawing pattern of the ship shown by a waveform in FIG. 5 and supplies information on such a point in time to the behavior feature value calculator 56 as an end timing of a particular behavior of the ship and as a start timing of a succeeding behavior of the ship. In an alternative form of the embodiment, the behavior detector 52 may determine the start timing and the end timing of each behavior of the ship based on a point in time at which the ship's heading θ takes a minimal value or at which the plus and minus signs of a second-order differential are reversed.

The start timing and the end timing of each ship behavior (yawing cycle) are sequentially supplied from the behavior detector 52 to the behavior feature value calculator 56, while the deviation (θ−θ0) output from the adder 18 is sequentially supplied to the behavior feature value calculator 56. The behavior feature value calculator 56 has a memory which stores the deviation (θ−θ0) in at least one behavior of the ship. The behavior feature value calculator 56 calculates values of behavior features based on the deviation (θ−θ0) supplied from the adder 18 during a time duration of each successive ship behavior. As an alternative, the behavior feature value calculator 56 may calculate the values of behavior features without the provision of the memory.

Figure 6:
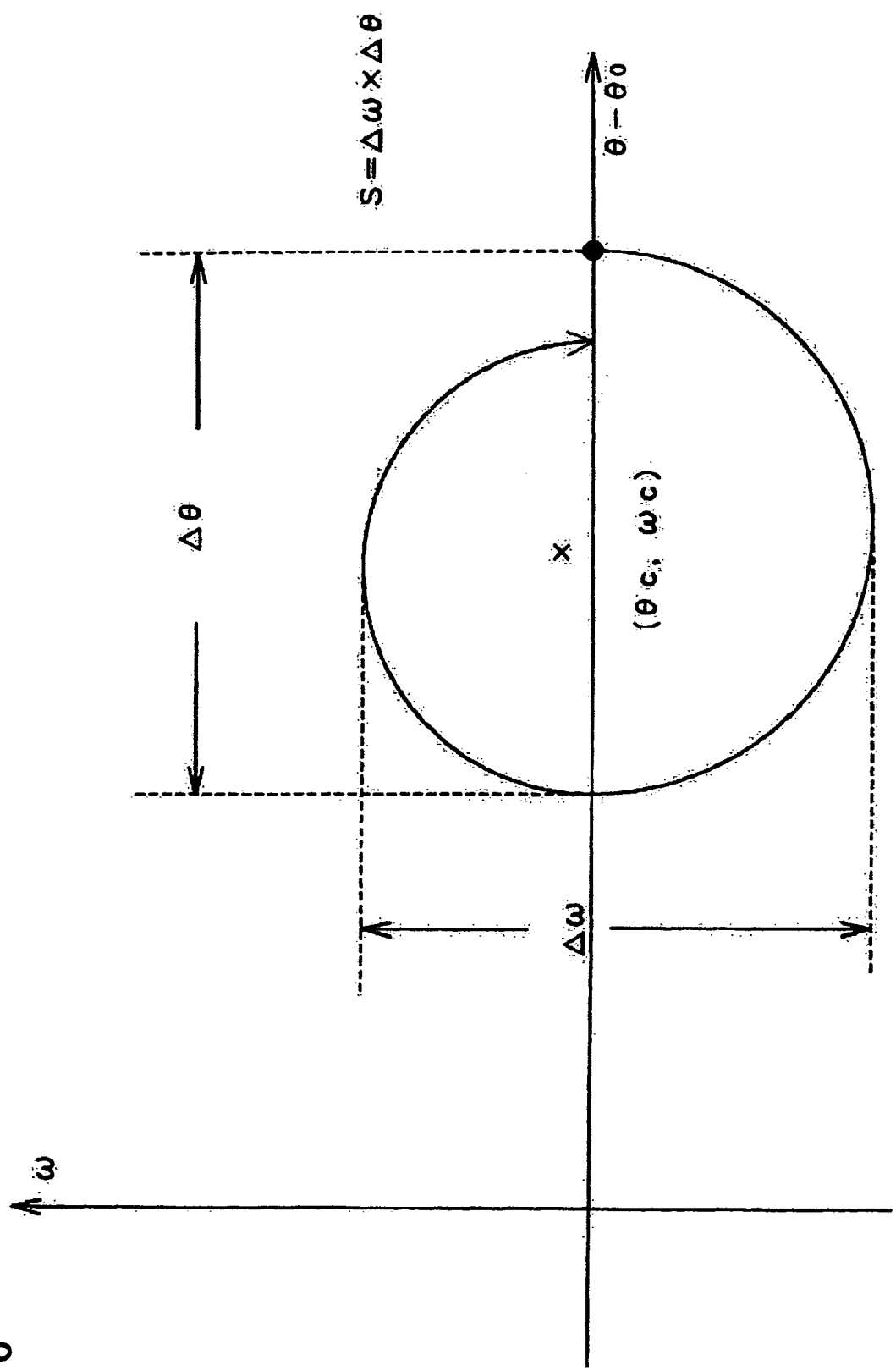
FIG. 6 is a diagram showing how the deviation and a first-order differential thereof vary during one ship behavior.

In this embodiment, the behavior feature value calculator 56 calculates an average θc of values of the deviation (θ−θ0) acquired during one behavior cycle, an average ωc of values of first-order differential ω of the deviation (θ−θ0) acquired during one behavior cycle, a difference Δθ between maximum and minimum values of the deviation (θ−θ0) acquired during one behavior cycle, a difference Δω between maximum and minimum values of the first-order differential values ω of the deviation (θ−θ0) acquired during one behavior cycle, a product S of the values of Δθ and Δω, a period T of ship behavior (yawing cycle, or behavior period) and elapsed time from the start timing to the end timing of each ship behavior as the values of features of each successive ship behavior. FIG. 6 is a diagram showing the deviation (θ−θ0) observed during a particular ship behavior in a phase plane of which horizontal axis represents the deviation (θ−θ0) and vertical axis represents the first-order differential ω of the deviation (θ−θ0). The behavior feature value calculator 56 calculates the values of θc, ωc, Δθ, Δω and S shown in FIG. 6 as the feature values of each successive ship behavior. The behavior feature value calculator 56 also calculates the ship's behavior period T.

The individual feature values thus calculated are stored in the behavior feature value memory 55. More specifically, the behavior feature value memory 55 stores ship behavior feature values, particularly the behavior period T, the product S of the values of Δθ and Δω and the square of θc, for a specific number of the latest behavior cycles (e.g., 5 cycles) as shown in FIG. 7. The basic state judgment data calculator 57 calculates basic state judgment data for each successive behavior cycle of the ship based on a content of data stored in the behavior feature value memory 55. The basic state judgment data includes an average value S_AVE of behavior (yawing) areas, a maximum value S_MAX of the behavior areas, a root mean square DV_CONT_RMS of angular-deviations of a center of the ship's behavior (yawing) and a standard deviation T_SD of behavior periods T. These pieces of the basic state judgment data are supplied to the control parameter setter 62. Here, the "behavior area" means the product S of the values of Δθ and Δω.

The average value S_AVE is an average of the behavior areas S in the aforementioned specific number of the latest behavior cycles stored in the behavior feature value memory 55. The average value S_AVE is given by equation (1) below:

$$S\_AVE = \Sigma Si/5 \qquad (1)$$

where the symbol Σ represents the sum of five values of a particular parameter and i is any of numbers 1 through 5. (This also applies to the following discussion in this Specification.)

Also, the maximum value S_MAX is the maximum value of the behavior areas S in the aforementioned specific number of the latest behavior cycles stored in the behavior feature value memory 55. The maximum value S_MAX is given by equation (2) below:

$$S\_MAX = MAX(S1, S2, S3, S4, S5) \qquad (2)$$

The root mean square DV_CONT_RMS of the angular deviations of the center of the ship's behavior (yawing) is the square root of the average of the squares of the averages θc of the deviations (θ−θ0) in the aforementioned specific number of the latest behavior cycles. The root mean square DV_CONT_RMS is given by equation (3) below:

$$DV\_CONT\_RMS = SQRT\{\Sigma \theta ci2/5\} \qquad (3)$$

where SQRT stands for the root mean square.

The standard deviation T_SD is the standard deviation of the behavior periods T in the aforementioned specific number of the latest behavior cycles. The standard deviation T_SD, which may be normalized depending on the amplitude of the ship's behavior, is given by equation (4) below:

$$T\_SD = \Sigma(Ti-Tave)2/5 \qquad (4)$$

where Tave (=ΣTi/5) is the average of the behavior periods T in the aforementioned specific number of the latest behavior cycles.

The control parameter setter 62 including the control state judgment section 63 judges a current state of control (control state), determines the aforementioned control parameters (KP, KI, KD) based on the result of this judgment, and supplies the control parameters (KP, KI, KD) to the steering amount calculator 22. More specifically, the control state judgment section 63 calculates an oscillation index, a disturbance index and a gain shortage index for a current behavior of the ship based on the basic state judgment data supplied from the behavior feature value calculator 56, and judges the current control state of the ship based on the indices. Then, the control parameter setter 62 determines the control parameters (KP, KI, KD) based on the-judgment result and supplies the control parameters (KP, KI, KD) to the steering amount calculator 22.

The control state judgment section 63 stores fuzzy inference data shown in FIGS. 8A, 8B, 8C, 9A, 9B, 9C, 10A and 10B and calculates the aforementioned indices based on the fuzzy inference data.

First, the control state judgment section 63 determines if the average value S_AVE of the behavior areas S is large, medium or small referring to a membership function shown in FIG. 8B. Also, the control state judgment section 63 determines if the standard deviation T_SD of the behavior periods T is large, medium or small referring to a membership function shown in FIG. 8C. Then, examining the results of these judgments with reference to FIG. 8A, the control state judgment section 63 determines if the oscillation index is large, small or nonexistent. Specifically, the control state judgment section 63 determines if the oscillation index of the current behavior of the ship is large, small or nonexistent based on the average value S_AVE of the behavior areas S and the standard deviation T_SD of the behavior periods T. Here, the oscillation index indicates how much an oscillating state of the current ship behavior, if any, is caused by ordinary control operation.

Similarly, the control state judgment section 63 determines if the maximum value S_MAX of the behavior areas S is large, medium or small referring to a membership function shown in FIG. 9B. Also, the control state judgment section 63 determines if the standard deviation T_SD of the behavior periods T is large, medium or small referring to a membership function shown in FIG. 9C. Then, examining the results of these judgments with reference to FIG. 9A, the control state judgment section 63 determines if the disturbance index is large, small or nonexistent. Specifically, the control state judgment section 63 determines if the disturbance index of the current behavior of the ship is large, small or nonexistent based on the average value S_AVE of the behavior areas S and the standard deviation T_SD of the behavior periods T. Here, the disturbance index indicates how much an oscillating state of the current ship behavior, if any, is caused by external disturbances.

Figures 10A, 10B:
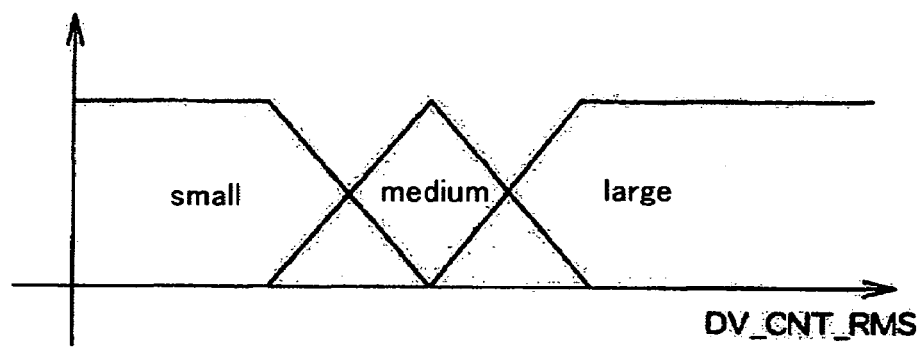
FIGS. 10A and 10B are diagrams showing fuzzy inference data used for evaluating the value of a gain shortage index by fuzzy inference.

Further, the control state judgment section 63 determines if the root mean square DV_CONT_RMS of the angular deviations of the center of the ship's behavior (yawing) is large, medium or small referring to a membership function shown in FIG. 10B. Then, examining the result of this judgment with reference to FIG. 10A, the control state judgment section 63 determines if the gain shortage index is large or nonexistent. Specifically, the control state judgment section 63 determines if the gain shortage index of the current behavior of the ship is large or nonexistent based on the root mean square DV_CONT_RMS of the angular deviations of the center of the ship's behavior. Here, the gain shortage index indicates how much an oscillating state of the current ship behavior, if any, results from a shortage of gain.

Subsequently, the control parameter setter 62 determines the control parameters (KP, KI, KD) based on the aforementioned judgment result obtained by the control state judgment section 63. Specifically, the control parameter setter 62 infers that the ship (controlled subject) is in a meandering (oscillating) condition (first maneuvering state) if the oscillation index is judged to be large. In this condition, the control parameter setter 62 decreases the value of the proportional coefficient KP, among the aforementioned control parameters (KP, KI, KD). If necessary, the control parameter setter 62 may vary the values of the other control parameters (KI, KD). The amount of decrease of the proportional coefficient KP may be a fixed amount or determined each time according to the seriousness of oscillation based on the average value S_AVE of the behavior areas S, for example.

Also, if the disturbance index is judged to be large in a case where the ship is not in the first maneuvering state, the control parameter setter 62 infers that the ship is in a stormy condition (second maneuvering state). In this condition, the control parameter setter 62 increases the value of the proportional coefficient KP and decreases the differential control coefficient KD, among the aforementioned control parameters (KP, KI, KD). If necessary, the control parameter setter 62 may vary the value of the other control parameter (KI). The amount of increase of the proportional coefficient KP and the amount of decrease of the differential control coefficient KD may be fixed amounts or determined each time according to the seriousness of the stormy condition, such as the magnitude of the deviation (e.g., the maximum value S_MAX of the behavior areas S).

Further, if the gain shortage index is judged to be large in a case where the ship is in neither the first maneuvering state nor the second maneuvering state, the control parameter setter 62 infers that the ship is in a deviating condition (third maneuvering state). In this condition, the control parameter setter 62 increases the value of the proportional coefficient KP, among the aforementioned control parameters (KP, KI, KD). If necessary, the control parameter setter 62 may vary the value of the other control parameters (KI, KD). The amount of increase of the proportional coefficient KP may be a fixed amount or determined each time according to the seriousness of gain shortage based on the root mean square DV_CONT_RMS of the angular deviations of the center of the ship's behavior, for example.

It is possible to achieve a stable ship maneuvering situation by setting the values of the control parameters (KP, KI, KD) according to maneuvering conditions in the aforementioned manner.

Figure 11:
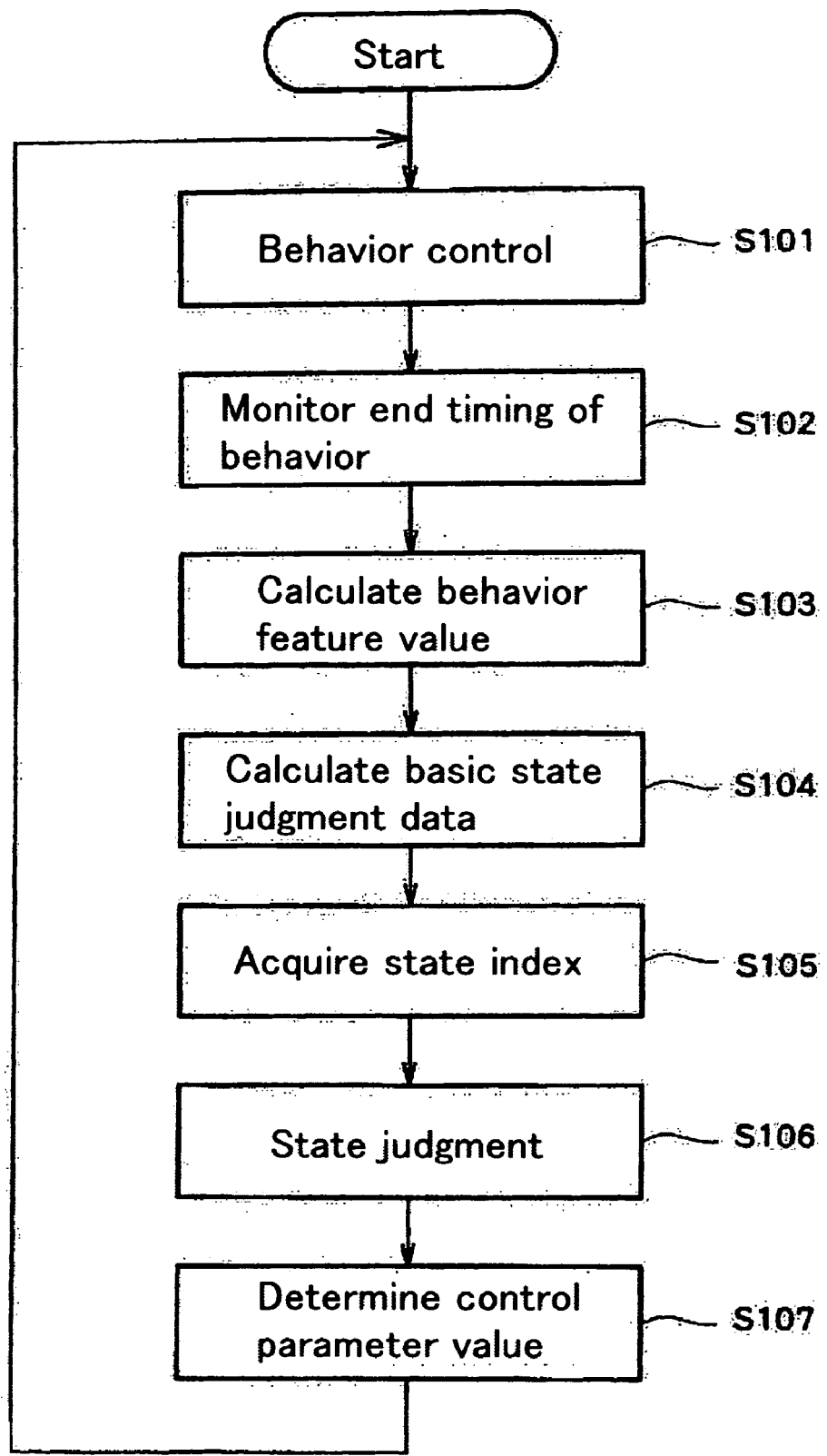
FIG. 11 is a flowchart showing an operating sequence of the automatic steering control system of the embodiment.

Operation of the automatic steering control system 10 of the present embodiment is now described in a step-by-step fashion referring to FIG. 11, which is a flowchart showing an operating sequence of the automatic steering control system 10.

In the automatic steering control system 10 of the embodiment, initial values of the control parameters (proportional coefficient KPo, integral coefficient KIo and differential coefficient KDo) are supplied to the steering amount calculator 22, and the steering unit 16 is controlled by using these initial values of the control parameters at the beginning during a first behavior (yawing) cycle (step S101). The behavior detector 52 monitors and detects the end timing of each successive behavior of the ship (step S102). When the behavior detector 52 detects the end timing of a behavior, the behavior detector 52 supplies information on the end timing of the behavior to the behavior feature value calculator 56, whereby the behavior feature value calculator 56 calculates behavior feature values ($\theta c$, $\omega c$, $\Delta\theta$, $\Delta\omega$, S, T, $\theta c2$) (step S103).

Part of the behavior feature values thus calculated is stored in the behavior feature value memory 55. Next, the basic state judgment data calculator 57 calculates the individual pieces of the basic state judgment data (S_AVE, S_MAX, DV_CONT_RMS, T_SD) based on the content of data stored in the behavior feature value memory 55 (step S104). The basic state judgment data thus calculated is supplied to the control parameter setter 62.

Subsequently, the control state judgment section 63 of the control parameter setter 62 acquires the individual indices (oscillation index, gain shortage index, disturbance index) based on the basic state judgment data (step S105), and determines the control state of the ship (first maneuvering state, second maneuvering state, third maneuvering state, or else) (step S106). Then, the control parameter setter 62 determines values of the control parameters based on the judgment result in step S106 (step S107). The automatic steering control system 10 then returns to step S101 and controls the steering unit 16 using the control parameters obtained in step S107 during a succeeding behavior cycle of the ship.

According to the automatic steering control system 10 of the embodiment so far discussed, it is possible to maneuver the ship in a stable fashion when the deviation of the ship's current heading $\theta$ (controlled quantity) from the intended course $\theta 0$ (target value) repetitively increases and decreases. This is achieved by judging the current control state (maneuvering situation) of the ship based on a regularity (pattern) of repetitive increases and decreases (variations) in the deviation and properly setting the control parameters based on the judgment result.

The invention being thus described, it will be obvious that the invention is not limited to the foregoing embodiment but may be varied in many ways. For example, the regularity (pattern) of periodical increases and decreases (variations) in the controlled quantity need not necessarily be evaluated based on the behavior period and standard deviation but may be evaluated based on the frequency of variations in the controlled quantity. While the foregoing discussion has illustrated one preferred embodiment in which the invention is applied to judging the current control state of the ship and controlling the steering unit thereof, the same is applicable also to other mobile units, as well as other types of controlled systems. Furthermore, the invention is applicable to controlling not only the direction of motion of a mobile unit but also the attitude or moving speed thereof. Moreover, the invention is applicable to controlling not only the motion of the mobile unit but also a physical quantity, such as temperature or density.

What is claimed is:

1. A control system for controlling a steering device of a ship to regulate the heading of the ship based on a deviation of the heading from a target value thereof and control parameters, said control system comprising:
   a behavior feature value detector for detecting a period of a yawing motion of the ship;
   a variation calculator for calculating the amount of variations in of the period of the yawing motion of the ship based on a plurality of periods of yawing motions; and the frequency; and
   a control parameter updator for updating the value of at least one of the control parameters based on the amount of said variations.

2. The control system according to claim 1, wherein the control parameter updator decreases the value of a proportional control coefficient which constitutes one of the control parameters according to an amplitude of the heading when the amount of said variations is smaller than a specific threshold value.

3. The control system according to claim 1 or 2, wherein the control parameter updator increases the value of a proportional control coefficient which constitutes one of the control parameters according to the magnitude of the deviation when the amount of said variations is equal to or larger than a specific threshold value.

4. The control system according to claim 3, wherein the control parameter updator decreases the value of a differential control coefficient which constitutes one of the control parameters when the amount of said variations is equal to or larger than the specific threshold value.

5. The control system according to claim 1, wherein the variation calculator calculates the amount of said variations based on a standard deviation of a period of a latest yawing motion of the ship.

6. The control system according to claim 1, said control system further comprising:
   a behavior detector for successively determining a time range of each of the yawing motion of the ship;
   wherein the behavior feature value detector detects said period of each of the yawing motion of the ship based on the time range.

7. The control system according to claim 6, wherein the behavior detector determines timings at which the heading takes extrema as being a start timing and an end timing of the time range of each of the yawing motion of the ship.

8. A control state judgment method used in a control system for regulating the heading of a ship based on a deviation of a controlled quantity from a target value thereof and control parameters, said control state judgment method comprising:
   a behavior feature value detecting step of detecting a period of a yawing motion of the ship;
   a variation calculating step of calculating the amount of variations of the period of the yawing motion of the ship based on a plurality of periods of yawing motions; and
   a control state judgment step of determining a control state of the ship based on the amount of said variations.

9. A control method for regulating the heading of a ship based on a deviation of the heading from a target value thereof and control parameters, said control method comprising:
   a behavior feature value detecting step of detecting a period of a yawing motion of the ship;
   a variation calculating step of calculating the amount of variations of the period of the yawing motion of the ship based on a plurality of periods of yawing motions; and
   a control parameter updating step of updating the value of at least one of the control parameters based on the amount of said variations.

10. A control state judgment device used in a control system for controlling a steering device of a ship by regulating the heading of the ship based on a deviation of a controlled quantity from a target value thereof and control parameters, said control state judgment device comprising:
    a behavior feature value detector for detecting a period of a yawing motion of the ship;
    a variation calculator for calculating the amount of variations of the period of the yawing motion of the ship based on a plurality of periods of yawing motions; and
    a control state judgment section for determining a control state of the ship based on the amount of said variations.

11. A control system for controlling a steering device of a ship to regulate the heading of the ship based on a deviation of the heading from a target value thereof and control parameters, said control system comprising:
    a behavior detector for determining timings at which the heading takes extrema as being a start timing and an end timing of a time range of each of the yawing motion of the ship;
    a behavior feature value detector for detecting a period of a yawing motion of the ship based on the time range;
    a variation calculator for calculating the amount of variations of the period of the yawing motion of the ship based on a plurality of periods of the yawing motions; and
    a control parameter updator for updating the value of at least one of the control parameters based on the amount of said variations.

12. The control system according to claim 11, further comprising:
    a behavior feature value memory for storing successive periods of the yawing motion of the ship;
    a judgment data calculator for calculating a judgment data for each of said successive periods of the yawing motion of the ship.

13. The control system according to claim 11, wherein the variation calculator calculates the amount of said variations based on a standard deviation of periods of latest yawing motions of the ship.

14. The control system according to claim 12, wherein the judgment data includes an average value of yawing areas, a maximum value of yawing areas, a root mean square of angular deviations of a center of the ship's yawing motion, and a standard deviation of yawing periods.

* * * * *